United States Patent [19]
Stryczek

[11] 3,722,717
[45] Mar. 27, 1973

[54] CONVEYOR SYSTEM FOR LOADING AND UNLOADING TRUCKS

[76] Inventor: Leon K. Stryczek, P.O. Box 134, Brooklyn, N.Y. 11222

[22] Filed: Aug. 22, 1969

[21] Appl. No.: 852,515

[52] U.S. Cl. ............. 214/83.22, 214/83.34, 188/64
[51] Int. Cl. .............................................. B60p 1/36
[58] Field of Search ..... 214/83.22, 82, 83.34; 188/64

[56] References Cited
UNITED STATES PATENTS

| | | | |
|---|---|---|---|
| 2,514,843 | 7/1950 | Clement | 214/83.22 |
| 2,679,941 | 6/1954 | Roesies | 214/83.22 |
| 2,912,129 | 11/1959 | Varrone | 214/82 |
| 3,342,354 | 9/1967 | Behr | 214/83.22 |
| 3,498,482 | 3/1970 | Lewis | 214/83.22 |

Primary Examiner—Albert J. Makay
Attorney—Karl F. Ross

[57] ABSTRACT

A conveyor movably receivable in a truck body for rapid loading and unloading of the truck comprises an endless band spanning a pair of end loaders and carries a wall member movable from one side of the truck body to the other. A brake, actuatable externally of the truck body, is provided to secure the band independently of a motor brake used to stop the conveyor, while a sill is provided at the rear of the body and is swingable downwardly out of the path of objects on the conveyor to permit loading and unloading. In its upper position, the sill lies in the path of any objects tending to be shifted rearwardly and actuates a control for cutting off the conveyor.

3 Claims, 7 Drawing Figures

PATENTED MAR 27 1973  3,722,717
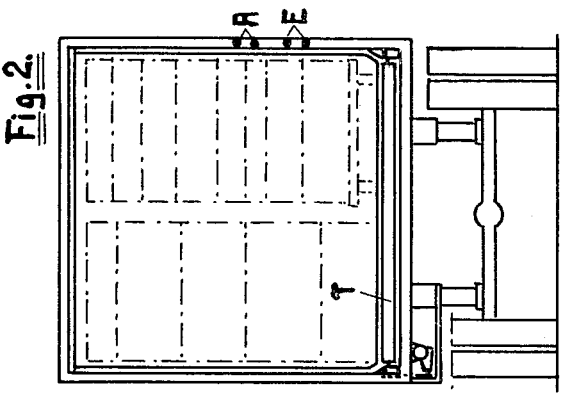
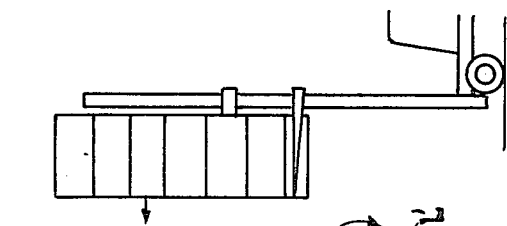
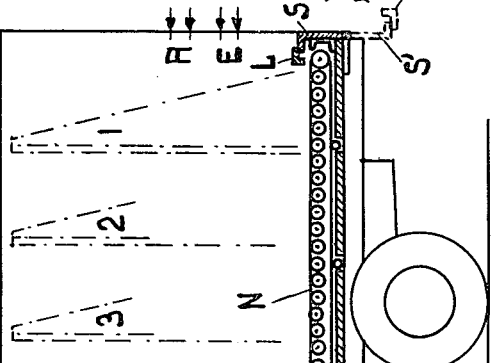
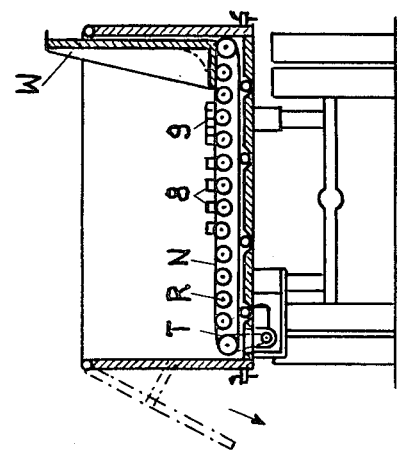
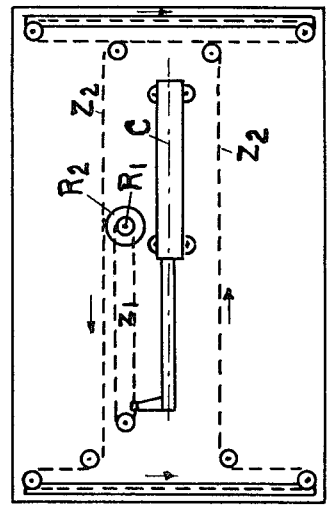
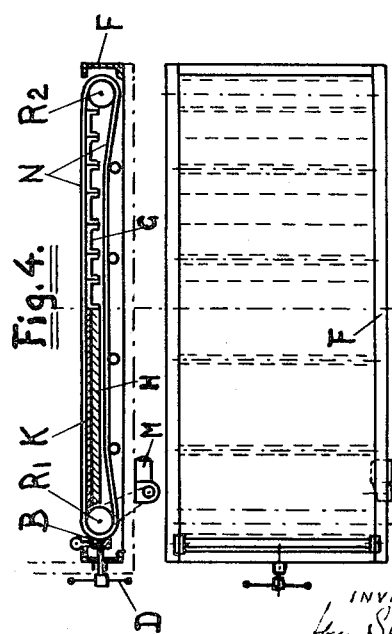
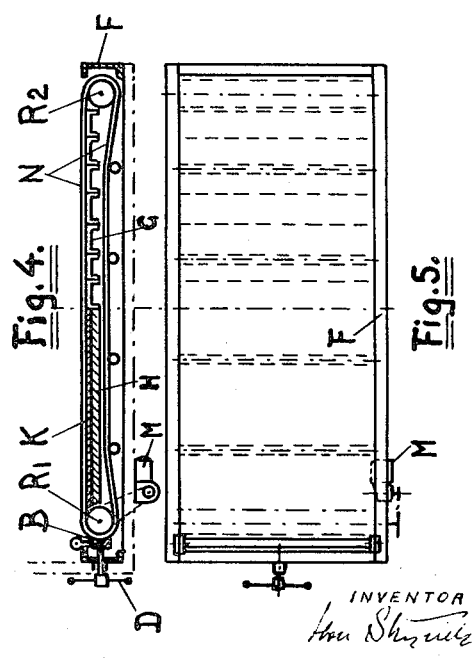
INVENTOR

CONVEYOR SYSTEM FOR LOADING AND UNLOADING TRUCKS

FIELD OF THE INVENTION

My present invention relates to a conveyor system for the rapid loading and unloading of a truck and, more particularly, to a conveyor for the purposes described which is received within a truck body.

BACKGROUND OF THE INVENTION

It has been proposed heretofore to provide truck bodies for moving floors or conveyors adapted to carry objects from the door or open side of the body inwardly or in the opposite direction for loading and unloading respectively.

OBJECTS OF THE INVENTION

It is the principal object of the present invention to provide an improved conveyor system for the purposes described which can be mounted in new and old vehicles, provides greater security against mobility of the load, and affords greater safety in operation than prior systems.

It is another object of the invention to provide a simple, convenient and safe conveyor system for use in the body of a truck.

SUMMARY OF THE INVENTION

These objects and others which will become apparent hereinafter are attained, in accordance with the present invention, by providing a truck body with a low-height conveyor complete in itself and formed with a support frame, a pair of end rollers or drums, and an endless conveyor band movable between said drums from one side of the truck body to an open side thereof, the frame and remaining portions of the conveyor being movably mounted in the body. Consequently the frame and conveyor structure may be introduced into a conventional truck body and may be removed therefrom when repair of the conveyor is desirable without interfering with use of the vehicle during this repair.

According to an important feature of the invention, the conveyor is provided with an electromotor for driving the belt and provided with the usual motor brake, while an additional brake operatively engages the belt directly, independently of the motor brake. This additional brake, which may be actuated externally of the truck body, secures the belt and the load thereon against movement resulting from acceleration or deceleration of the truck and does not depend upon a braking of the axles of the conveyor drums or rollers. Hence damage to the latter is avoided. Preferably, this additional brake is provided with an automatic switch for ensuring that the motor is de-energized as long as the additional brake is engaged.

Still another feature of the invention resides in the provision of a doorsill at the open side or door of the truck body, swingable between a closed position in which the sill partially obstructs the opening, and an open position wherein the sill is out of the path of articles upon the conveyor. When the doorsill is swung downwardly, articles may be loaded or unloaded, but in the closed position of the sill, any outward force applied by articles upon the conveyor serves to de-energize the conveyor and prevents undesired discharge of the goods.

Still another feature of the invention resides in the provision of a movable wall on the conveyor for shifting the load and movable from the opening of the truck body in the direction of a stationary wall, generally the front wall, thereof. Automatic switch means is provided for energization as the movable wall approaches the stationary wall to cut off electric current to the conveyor when the latter is in the fully loaded position of the conveyor. I have found it desirable, moreover, to provide switch means in the form of a pair of buttons adjacent the door of the truck body so that both buttons must be depressed when energization of the conveyor is desired. This insures operation of the conveyor only when intended and guarantees that an operator will monitor the conveyor at all times, thereby preventing injury to children and strangers. Advantageously, the conveyor is of low height as noted earlier and comprises a thin elastic belt which is supported intermediate the terminal rollers by a sheet-metal floor or rollers of small diameter. The belt can be subdivided in breadth so that short rollers of greater strength can be used. The moving wall can also be subdivided, with each part being movable independently of the other. In place of the electric motor I may make use of a hydraulic motor and even can employ a cylinder and piston arrangement connected to a transmission for shifting the conveyor belt. The body of the truck may receive a large container with walls and support feet and displaceable by the conveyor. The conveyor can thus unload the container and enable the truck to be used for other services while the container is unloaded.

DESCRIPTION OF THE DRAWING

The above and other objects, features and advantages of the present invention will become more readily apparent from the following description reference being made to the accompanying drawing in which:

FIG. 1 is a side-elevational view, partly in vertical section, of a truck provided with a conveyor system embodying the present invention;

FIG. 2 is an end view of the truck;

FIG. 3 is an elevational view of a fork-lift truck for loading the vehicle of FIG. 1;

FIG. 4 is a vertical cross section of the conveyor removed from the truck;

FIG. 5 is a top view of the conveyor;

FIG. 6 is an end view in vertical section of a truck provided with lateral opening means; and FIG. 7 is a plan view of a hydraulically driven conveyor embodying the invention.

SPECIFIC DESCRIPTION

In FIGS. 1 and 2, I show a truck having a moving floor T formed as a conveyor band spanning rolls R journaled on a frame F, the belt being designated at N. An electric motor M is also mounted on the frame to drive the belt reversible via a chain as shown in broken lines in FIG. 4. The motor has, as is customary, an electric brake or a worm drive so that, when the motor is de-energized, the driven roll is located against movement.

The system is provided with a further brake B in the form of a brakeshoe driven by a handwheel D operable externally of the vehicle body (FIG. 1) and adapted to bear directly against the belt. The motor M is driven from the electrical system of the truck.

In FIG. 2, I have shown pairs of buttons A and E located adjacent the opening which are connected with the motor M to operate the conveyors for forward and rearward movement as long as both buttons of each pair are depressed. As soon as either button is released, the conveyor is halted. The system is also provided with a doorsill L which is shown in solid lines in its closed position in FIG. 1. As soon as an article on the conveyor contacts this sill and tends to move it rearwardly, the sill switch de-energizes the motor. However, the sill may be swung downwardly as shown at L' if goods are to be loaded or unloaded.

The movable wall W entrained by the conveyor is provided with means engaging switch buttons P of the stationary wall V at the front end of the truck body. These switches are designed to cut off the motor when the wall W is received in its fully loaded position within the truck. A switch is provided on the brake B to cut off current to the motor when the brake is on but to allow the flow of current when the brake is off, thereby preventing the motor from burning out. In the event the electrical system is inoperative, the handcrank may be used to apply to brake and secure the conveyor against motion.

The rolls can be divided so that they may be made short and strong and the belt N and the wall W can be similarly divided with each part working independently from the other.

In FIG. 3, I have shown a service vehicle for loading or unloading the goods. The successive positions of the moving wall W are represented by numbers 1 – 7. First the goods are stacked against the wall in position 1 and the wall is then shifted forwardly to position 2 and another stack of goods is loaded.

In FIG. 4, I show a modification of the system in which the main rollers $R_1$ and $R_2$ are spanned by the belt N which rests upon a smooth sheet metal floor K received in the frame F. The floor may also be made from metal channels G. The boards H and the channels G can be anchored in the frame F. The brake B can be mechanical as illustrated or of the hydraulic type.

The apparatus is designed to receive a large container in which the goods are disposed as previously described. In FIG. 6, I have shown the system with a side moving conveyor T so that the goods can be unloaded on the right or left side of the truck. Where reference numerals in FIGS. 6 and 7 are identical to those of other Figures, they represent identical elements. From FIG. 6, it is apparent that either side wall of the truck may be swung outwardly so that the goods may be loaded from either the right or the left side. In FIG. 7, there is shown a piston-and-cylinder arrangement for actuating the conveyor via pulleys $R_1$ and $R_2$ establishing a transmission ratio and ropes $Z_1$ and $Z_2$ which pass around these pulleys. Another conveyor may be used as well.

I claim:

1. The combination with a truck having a body adapted to receive a load of a conveyor removably received in said body and comprising a frame, a pair of main rollers journaled in said frame, an endless band passing around said main rollers and extending to an open side of said body, a motor operatively connected with one of said rollers for reversibly driving said band to advance a load into said body and carry a load outwardly therefrom, said motor being provided with means retarding rotation of said one of said rollers upon de-energization thereof, a brake operable independently of the last-mentioned means and engageably directed with said band for retaining said band and a load thereon against movement upon acceleration and deceleration of said truck, a sill at said open side swingable between a position in the path of articles on said band and a position out of said path, and control means operatively connecting said sill and said motor for de-energizing same upon engagement of said sill by an article on said band in the closed position of said sill.

2. The combination with a truck having a body adapted to receive a load of a conveyor removably received in said body and comprising a frame, a pair of main rollers journaled in said frame, an endless band passing around said main rollers and extending to an open side of said body, a motor operatively connected with one of said rollers for reversibly driving said band to advance a load into said body and carry a load outwardly therefrom, said motor being provided with means retarding rotation of said one of said rollers upon de-energization thereof, a brake operable independently of the last-mentioned means and engageably directed with said band for retaining said band and a load thereon against movement upon acceleration and deceleration of said truck, said brake including a brakeshoe adapted to bear against said band at said one of said rollers, and a handwheel actuatable externally of said body for shifting said brakeshoe.

3. The combination defined in claim 2, further comprising a movable wall carried by said band and movable thereon from said open side toward a stationary wall formed on said body, and switch means on one of said walls for de-energizing said motor upon the approach of said movable wall to said stationary wall.

* * * * *